(12) United States Patent
Beckman et al.

(10) Patent No.: US 9,197,267 B2
(45) Date of Patent: Nov. 24, 2015

(54) METHODS AND APPARATUS FOR JOINT DEMODULATION WITH MAX-LOG MAP (MLM)

(71) Applicant: QUALCOMM Incorporated, San Diego, CA (US)

(72) Inventors: James Edward Beckman, La Jolla, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/246,667

(22) Filed: Apr. 7, 2014

(65) Prior Publication Data

US 2014/0301512 A1    Oct. 9, 2014

Related U.S. Application Data

(60) Provisional application No. 61/810,243, filed on Apr. 9, 2013.

(51) Int. Cl.
| | |
|---|---|
| *H04B 7/02* | (2006.01) |
| *H04B 1/12* | (2006.01) |
| *H04B 7/08* | (2006.01) |
| *H04L 1/00* | (2006.01) |
| *H04B 7/04* | (2006.01) |

(52) U.S. Cl.
CPC ............. *H04B 1/123* (2013.01); *H04B 7/0854* (2013.01); *H04L 1/0055* (2013.01); *H04B 7/0413* (2013.01)

(58) Field of Classification Search
CPC . H04L 1/005; H04L 25/03171; H04L 1/0055; H04L 1/0048; H04L 1/06; H04L 25/0204; H04L 1/0054; H04B 1/7105; H04B 7/0413
USPC .................................................. 375/267, 341
See application file for complete search history.

(56) References Cited

U.S. PATENT DOCUMENTS

| | | | |
|---|---|---|---|
| 2005/0018793 A1* | 1/2005 | Learned .......................... | 375/340 |
| 2006/0029124 A1* | 2/2006 | Grant et al. ..................... | 375/148 |
| 2007/0116143 A1 | 5/2007 | Bjerke et al. | |
| 2011/0051831 A1* | 3/2011 | Subrahmanya et al. ....... | 375/262 |
| 2011/0051858 A1 | 3/2011 | Salvekar et al. | |
| 2013/0107805 A1 | 5/2013 | Luo et al. | |
| 2013/0163704 A1 | 6/2013 | Liu et al. | |
| 2013/0287150 A1 | 10/2013 | Jung et al. | |
| 2013/0301686 A1 | 11/2013 | Reial et al. | |
| 2014/0044094 A1 | 2/2014 | Vijayan et al. | |

OTHER PUBLICATIONS

International Search Report and Written Opinion—PCT/US2014/033279—ISA/EPO—Jul. 11, 2014.

(Continued)

*Primary Examiner* — Don N Vo
(74) *Attorney, Agent, or Firm* — Patterson & Sheridan, LLP

(57) ABSTRACT

Certain aspects of the present disclosure relate to techniques and apparatus for performing joint demodulation using a Max-Log MAP algorithm in wireless communications systems. An exemplary method generally comprises receiving a signal comprising one or more serving streams and one or more interfering streams; and processing the signal by performing joint demodulation using a max log map (MLM) algorithm for at least one of the one or more serving streams or at least one of the one or more interfering streams.

26 Claims, 4 Drawing Sheets

(56) References Cited

OTHER PUBLICATIONS

Medvedev I., et al., "A comparison of MIMO receiver structures for 802.11N WLAN—Performance and Complexity," IEEE 17th Inter National Symposium on Personal, Indoor and Mobile Radio Communications, Sep. 1, 2006, pp. 1-5, XP031023431, ISBN: 978-1-4244-0329-5, Chapter III, Receiver Structures.

* cited by examiner

METHODS AND APPARATUS FOR JOINT DEMODULATION WITH MAX-LOG MAP (MLM)

CROSS-REFERENCE TO RELATED APPLICATIONS

The present application for patent claims priority to U.S. Provisional Application No. 61/810,243, filed Apr. 9, 2013, which is assigned to the assignee of the present application and hereby expressly incorporated by reference herein in its entirety.

FIELD

Certain aspects of the present disclosure generally relate to wireless communications and, more particularly, to a methods and apparatus for joint demodulation with max-log MAP (MLM).

BACKGROUND

In a transmitter of all modern wireless communication links, an output sequence of bits from an error correcting code can be mapped onto a sequence of complex modulation symbols. These symbols can be then used to create a waveform suitable for transmission across a wireless channel. In general, the symbols can be mapped to various transmit locations in frequency, time, and space. One of the receiver tasks can be to make inferences about the encoder output sequence based on the received symbols, which are generally corrupted by noise and scaled by a (e.g., known) complex channel. When multiple transmit antennas are used to transmit independent spatial streams over identical time/frequency locations, for example, the transmit symbols couple in the transmission. Improved demapping operations are desired.

SUMMARY

Certain aspects of the present disclosure provide techniques and apparatus for joint demodulation using max log MAP.

Certain aspects provide a method for wireless communications. The method generally includes receiving a signal comprising one or more serving streams and one or more interfering streams and processing the signal by performing joint demodulation using a max log MAP (MLM) algorithm for at least one of the one or more serving streams or at least one of the one or more interfering streams.

Certain aspects provide an apparatus for wireless communications. The method apparatus includes means for receiving a signal comprising one or more serving streams and one or more interfering streams and means for processing the signal by performing joint demodulation using a max log MAP (MLM) algorithm for at least one of the one or more serving streams or at least one of the one or more interfering streams.

Certain aspects provide a computer program product for wireless communications. The computer program product generally includes a computer readable medium having instructions stored thereon for receiving a signal comprising one or more serving streams and one or more interfering streams and processing the signal by performing joint demodulation using a max log MAP (MLM) algorithm for at least one of the one or more serving streams or at least one of the one or more interfering streams.

Certain aspects provide an apparatus for wireless communications. The method apparatus includes a receiver configured to receive a signal comprising one or more serving streams and one or more interfering streams, and at least one processor configured to process the signal by performing joint demodulation using a max log MAP (MLM) algorithm for at least one of the one or more serving streams or at least one of the one or more interfering streams.

The techniques may be embodied in methods, apparatuses, and computer program products.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
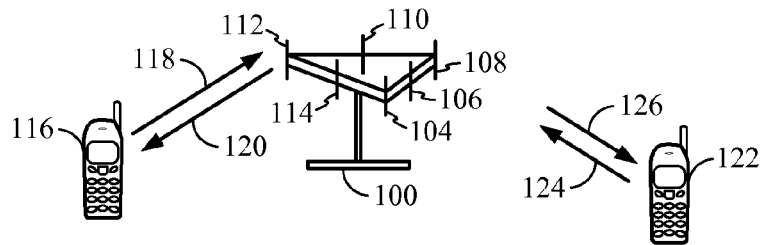
FIG. 1 illustrates an example wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

A demapping operation is generally required to account for all of the interfering streams when making (e.g., soft) decisions about a stream of interest. Methods and apparatus for joint demodulation with max-log MAP (MLM) are provided including reduced-complexity methods and apparatus.

An Example Wireless Communication System

The techniques described herein may be used for various wireless communication networks such as Orthogonal Frequency Division Multiplexing (OFDM) networks, Time Division Multiple Access (TDMA) networks, Frequency Division Multiple Access (FDMA) networks, Orthogonal FDMA (OFDMA) networks, Single-Carrier FDMA (SC-FDMA) networks, Code Division Multiple Access (CDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16 (e.g., WiMAX (Worldwide Interoperability for Microwave Access)), IEEE 802.20, Flash-OFDM®, etc. UTRA, E-UTRA, and GSM are part of Universal Mobile Telecommunication System (UMTS). Long Term Evolution (LTE) and Long Term Evolution Advanced (LTE-A) are upcoming releases of UMTS that use E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). CDMA2000 is described in documents from an organization named "3rd Generation Partnership Project 2" (3GPP2). These various radio technologies and standards are known in the art. For clarity, certain aspects of the techniques are described below for LTE and LTE-A.

The teachings herein may be incorporated into (e.g., implemented within or performed by) a variety of wired or wireless apparatuses (e.g., nodes). In some aspects a node comprises a wireless node. Such wireless node may provide, for example, connectivity for or to a network (e.g., a wide area network such as the Internet or a cellular network) via a wired or wireless communication link. In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In some implementations an access point may comprise a set top box kiosk, a media center, or any other suitable device that is configured to communicate via a wireless or wired medium.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), a tablet, an entertainment device (e.g., a music or video device, or a satellite radio), a television display, a flipcam, a security video camera, a digital video recorder (DVR), a global positioning system device, or any other suitable device that is configured to communicate via a wireless or wired medium.

Referring to FIG. 1, a multiple access wireless communication system according to one aspect is illustrated. In an aspect of the present disclosure, the wireless communication system from FIG. 1 may be a wireless mobile broadband system based on Orthogonal Frequency Division Multiplexing (OFDM). An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Certain aspects of the present disclosure support joint demodulation using MLM. Certain aspects of the present disclosure support a two-step joint de-mapping algorithm for determining log-likelihood ratio (LLR) of bits associated with a received multiple-input multiple-output (MIMO) signal. The first step of the proposed detection algorithm may comprise applying a linear minimum mean square error (LMMSE) based estimation to form soft symbol estimates of symbols being transmitted. The next step may comprise utilization of the LMMSE-based soft symbol estimates to form a set of constellation points of a stream interfering to a stream of interest. These candidate constellation points may be then subtracted from the received MIMO signal in order to improve computations of bit LLRs associated with the stream of interest. In one aspect of the present disclosure, the proposed joint demodulation using MLM and/or two-step de-mapping algorithm may be performed at the access terminals 116, 122 from FIG. 1. In another aspect, the proposed algorithm may be performed at the access point 100.

Figure 2:
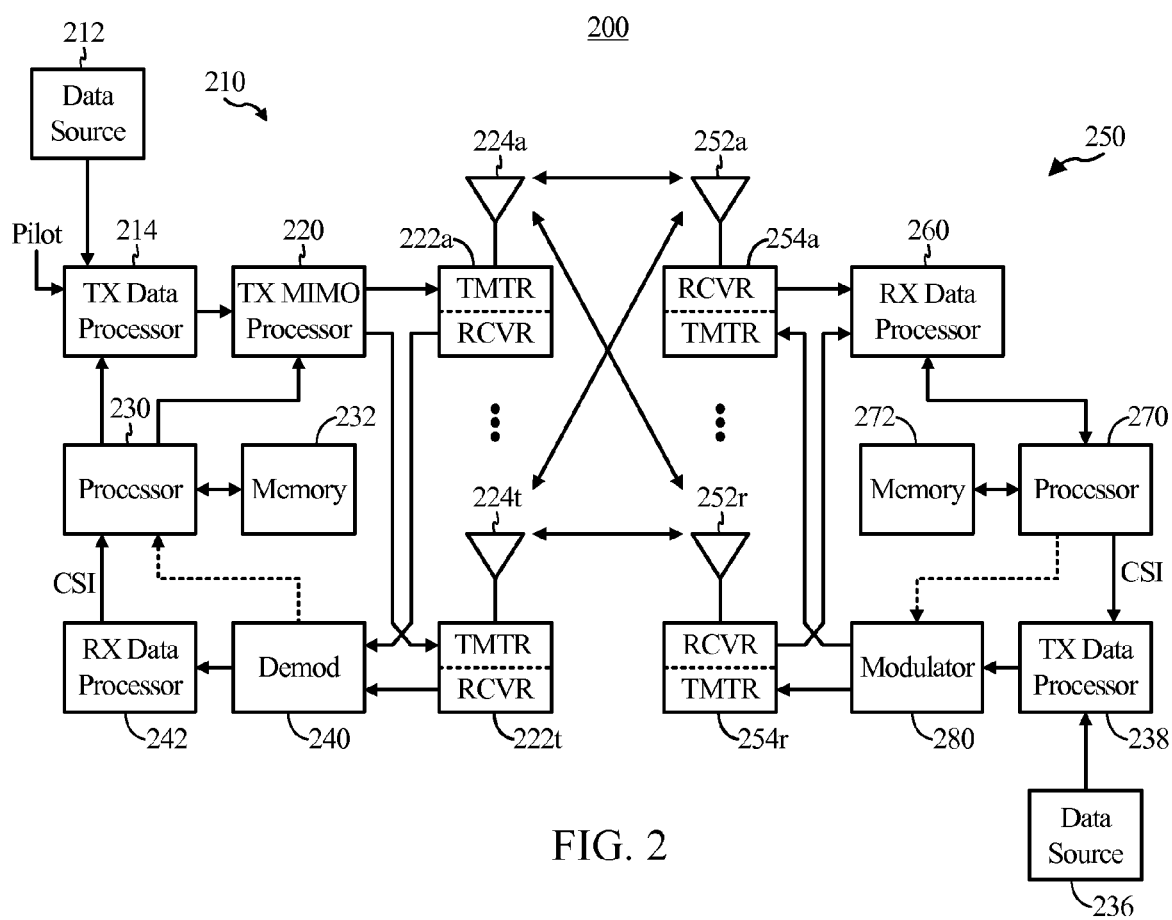
FIG. 2 illustrates a block diagram of an access point and a user terminal in accordance with certain aspects of the present disclosure.

FIG. 2 illustrates a block diagram of an aspect of a transmitter system 210 (e.g., also known as the access point) and a receiver system 250 (e.g., also known as the access terminal) in a wireless communications system, for example, a MIMO system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, m-QPSK, or m-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

In one aspect of the present disclosure, the aforementioned two-step joint de-mapping algorithm for computing bit LLRs based on LMMSE detection and sphere decoding may be performed at the transmitter system 210, e.g., at the processor 230. In another aspect, the proposed two-step de-mapping algorithm may be performed at the receiver system 250, e.g., at the processor 270. In one aspect of the present disclosure, the aforementioned joint demodulation using MLM may be performed at the transmitter system 210, e.g., at the processor 230 and/or other processors and modules at the transmitter system 210. In another aspect, the aforementioned joint demodulation using MLM may be performed at the receiver system 250, e.g., at the processor 270 RX data processor 260, and/or other processors and modules at the receiver system.

Figure 3:
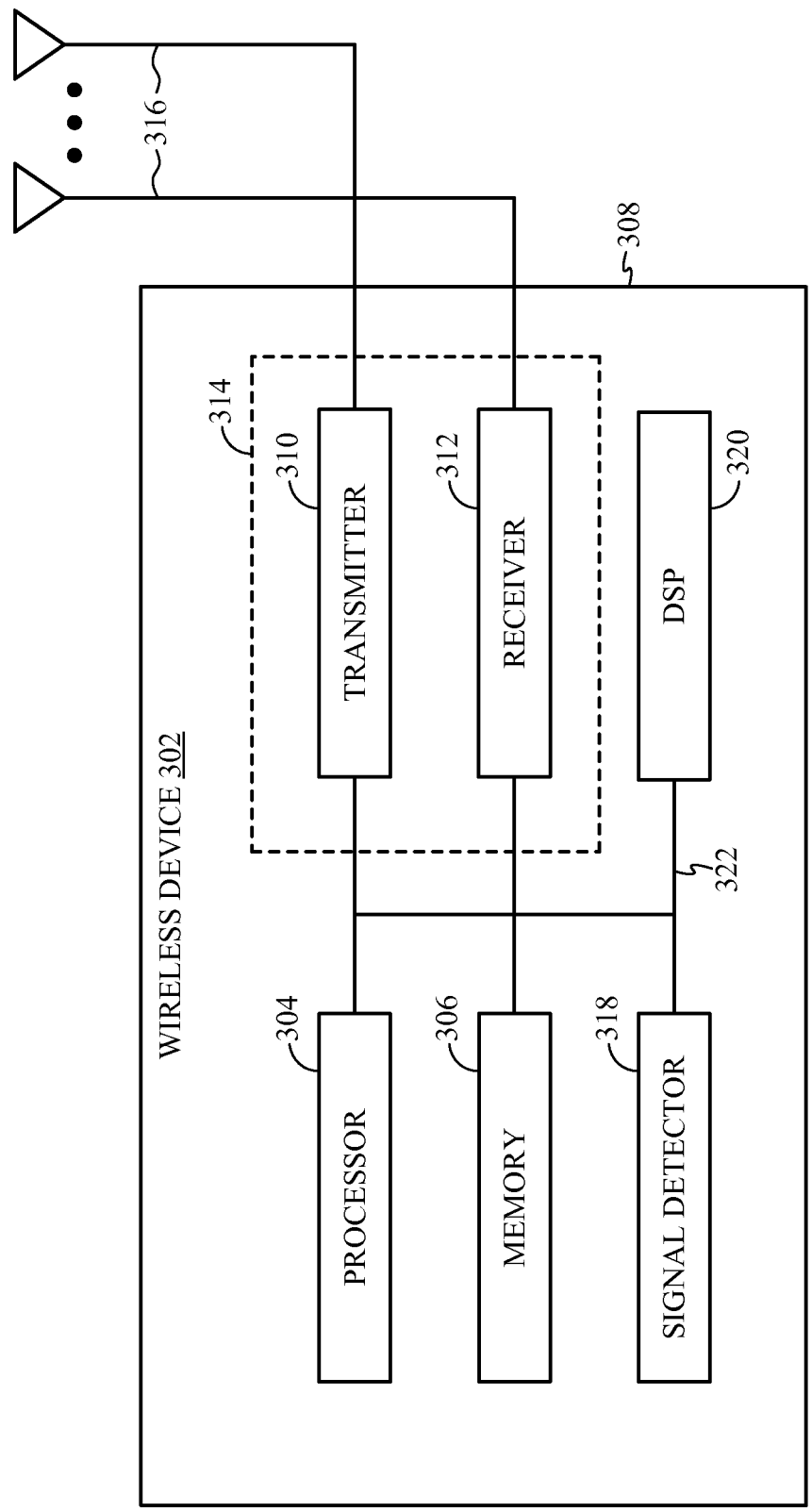
FIG. 3 illustrates a block diagram of an example wireless device in accordance with certain aspects of the present disclosure.

FIG. 3 illustrates various components that may be utilized in a wireless device 302 that may be employed within the wireless communication system from FIG. 1. The wireless device 302 is an example of a device that may be configured to implement the various methods described herein. The wireless device 302 may be an access point 100 from FIG. 1 or any of access terminals 116, 122.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

According to certain aspects of the present disclosure, the aforementioned joint demodulation using MLM and/or two-step joint de-mapping algorithm for computing bit LLRs based on LMMSE detection and sphere decoding may be performed at the wireless device 302, e.g., at the processor 304. In one aspect, the wireless device 302 may operate as an access terminal. In another aspect, the wireless device 302 may operate as a base station.

The various components of the wireless device 302 may be coupled together by a bus system 322, which may include a power bus, a control signal bus, and a status signal bus in addition to a data bus.

Joint Demodulation with MLM

Certain aspects of the present disclosure relate to techniques that may be used to perform joint demodulation in wireless communications systems. The present techniques may include interference suppression.

An optimal receiver in an interference environment may jointly demodulate both the serving streams and interference streams. The challenge for joint demodulation is that the optimal receiver (MAP) complexity grows exponentially with the number of streams. According to certain aspects of the present disclosure, a method for joint demodulation using MLM is provided.

According to certain aspects, a notation may be used where y is the received data vector, H is the joint (serving and interfering) channel matrix, x is the joint transmitted data vector, and n is the received noise vector.

$$y = Hx + n$$

Each element in the vector x may belong to a discrete signal constellation such as QPSK, 16-QPSK, 64-QAM or 256-QAM. For example, in LTE release 11, the maximum constellation size is 64-QAM, which means each element in x may have up to 6 bits which corresponds to 64 hypotheses per stream.

Figure 4:
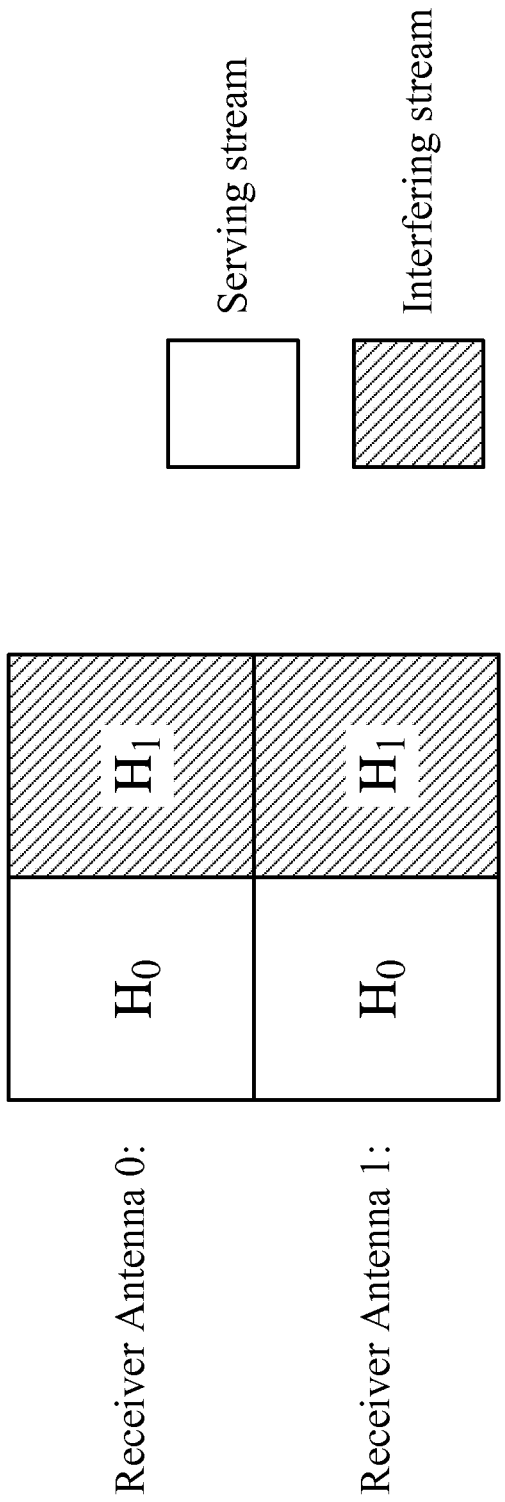
FIG. 4 illustrates an example joint decoding scenario, in which aspects of the present disclosure may be applied.

According to certain aspects, a joint channel may have $N_{serve}$ signal streams and $N_{int}$ interfering streams. At the receiver, there may be $N_{rx}$ receiver antennas for demodulation. For example, a joint channel may comprise $N_{rx}=2$, $N_{serve}=1$ and $N_{int}=1$ as shown in FIG. 4.

In joint demodulation, the MAP receiver may have optimal performance, requiring evaluation of the likelihood of every possible hypothesis. However, MAP may not be feasible for MIMO with $N_{serve}$ serving streams and $N_{int}$ interfering streams since it would require evaluating $64^{N_{serve}+N_{int}}$ hypotheses for 64-QAM. Thus, there is a need for a method of joint demodulation and interference suppression that approaches the optimal MAP performance with reasonable complexity.

According to certain aspects, a LMMSE (Least Minimum Mean Square Error) receiver may be used, which linearly estimates x given y and the joint channel H. However, performance may be significantly degraded compared to the optimal MAP receiver.

Therefore, aspects of the present disclosure relate to methods which uses MLM to approach the optimal MAP performance with very reasonable complexity.

Example Joint Demodulation Mechanism

Joint demodulation using an MLM algorithm may provide performance benefits of MAP with significantly lower complexity. MLM may reduce complexity by only evaluating the most likely hypothesis for at least one stream in a process that may be referred to as "slicing." For example, in a modem with 64-QAM, 1 serving stream, and 1 interference stream, a few exponentials (e.g., less than or equal to 128) may be calculated rather than calculating all 4,096 exponentials for MAP.

It may be shown that MLM very closely approximates MAP performance. MLM may be the maximum likelihood approximation of MAP where at least one layer is sliced, meaning that the most likely hypothesis is used for that layer. In general, it may be shown that MLM significantly outperforms the LMMSE receiver in many cases.

According to certain aspects, a model may be used where y is the received data vector, H is the joint channel matrix, x is the joint transmitted data vector, and n is the noise vector. This gives the formulation y=Hx+n.

The following describes a technique using an MLM algorithm, whose objective is to solve for the bit likelihoods of x given y, H and the unknown n (noise). According to certain aspects, an algorithm for MLM may be as follows. First, the receiver may record y. Next, the receiver may estimate H which combines the channel corresponding to the N_serve serving streams and N_int interfering streams. Finally, the receiver may solve for $LLR(b_{s,k})$ which is the bit log likelihood ratio of $b_{s,k}$ where k is the bit index and s is the stream indices in the serving streams.

The joint transmitted data vector x is a vector with a (e.g., each) component belonging to a discrete set denoted $Q_0 \ldots Q_{N_{serve}-1}$. The discrete set may be QPSK, 16-QAM, 64-QAM or 256-QAM. For example, the set may be the QPSK constellation:

$$\left(\frac{1}{\sqrt{2}} + \frac{1}{\sqrt{2}}j, \frac{1}{\sqrt{2}} - \frac{1}{\sqrt{2}}j, -\frac{1}{\sqrt{2}} + \frac{1}{\sqrt{2}}j, -\frac{1}{\sqrt{2}} - \frac{1}{\sqrt{2}}j\right).$$

The bit log likelihood ratio may be given by:

$$LLR(b_{s,k}) = \log\left(\frac{Pr(b_{s,k} = 0)}{Pr(b_{s,k} = 1)}\right)$$

where Pr is the probability. With MAP, the exact probability of the bit is given by:

$$Pr(b_{s,k} = i) = \sum_{x_0, \ldots, x_{N_{Serve}+N_{Int}-1}: b_k = i} \exp(\varphi(x_0, \ldots, x_{N_{Serve}+N_{Int}-1}))$$

where i is a value of 0 or 1. The interior of the exponential is given by:

$$\varphi(x_0, \ldots, x_{N_{Serve}+N_{Int}-1})$$

which may correspond to the probability density function of a multivariate normal random.

Using an MLM algorithm, however, a limited number of hypotheses are evaluated (e.g., only a subset of hypotheses from a set of hypotheses), which may greatly reduce complexity. For example, using an MLM algorithm, only the most likely hypothesis may be used, which is the largest exponential for at least one of the layers (e.g., this process may be referred to as "slicing"). Slicing may reduce complexity by a factor equal to the size of the constellation since only one hypothesis is evaluated for that stream (e.g., or one or more layers associated therewith). For example, for the QPSK constellation described above, a 4 to 1 reduction in complexity may be achieved.

According to certain aspects, various approximations may be used to further reduce complexity for MLM. For example, in some cases, the maximum value of the interior of the remaining exponentials may be used. This may involve using the following equation:

$$Pr(b_{s,k} = i) \sim \max_{x_0, \dots, x_{N_{Serve}+N_{Int}-1}: b_k = i} \varphi(x_1, x_2).$$

Additionally or alternatively, a sum of a subset of the remaining exponentials may be used. For example, the two largest exponentials may be added:

$$Pr(b_{s,k} = i) \sim \max_{x_0, \dots, x_{N_{Serve}+N_{Int}-1}: b_k = i} \varphi(x_1, x_2) + \max2_{x_0, \dots, x_{N_{Serve}+N_{Int}-1}: b_k = i} \varphi(x_1, x_2) + \dots$$

where max2 refers to the second largest exponential.

Additionally or alternatively, the remaining exponentials may be added using numerical approximations (such as M*LM) (e.g., a linear numerical approximation) rather than calculating every exponential explicitly.

According to certain aspects, complexity may be further reduced by only solving LLR ($b_{s,k}$) for the serving streams rather than for all streams. This may be possible as the receiver may be interested only in the bits of the serving stream, such that solving LLR for the interfering streams may be wasteful.

Figure 5:
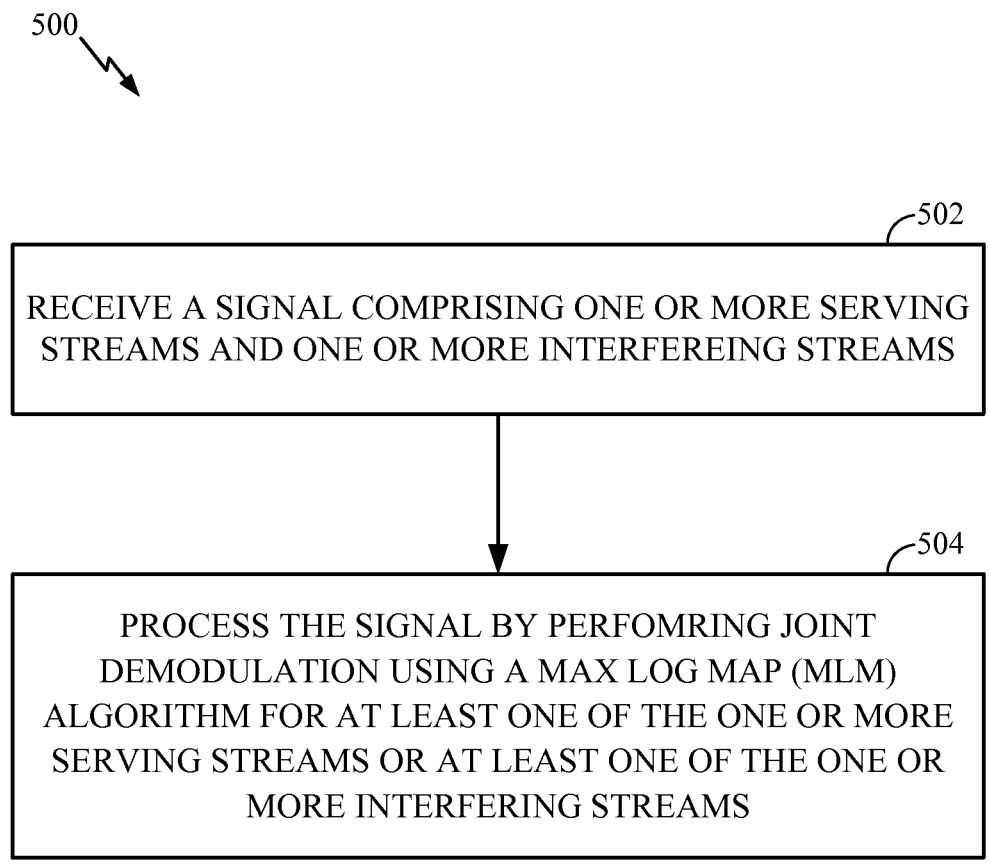
FIG. 5 is a functional block diagram conceptually illustrating example blocks that may be performed at a receiver of a wireless system in accordance with certain aspects of the present disclosure.

FIG. 5 is a functional block diagram conceptually illustrating example blocks 500 that may be performed, for example, at a receiver in accordance with certain aspects of the present disclosure. Operations illustrated by the blocks 500 may be executed, for example, at the RX data processor 260 of the receiver system 250 from FIG. 2, at the RX data processor 242 of the transmitter system 210 from FIG. 2, or at the processor 304 of the wireless device 302 from FIG. 3.

The operations may begin, at block 502, by receiving a signal comprising one or more serving streams and one or more interfering streams. At block 504, the signal may be processed by performing joint demodulation using a max log MAP (MLM) algorithm for at least one of the one or more serving streams (e.g., or one or more layers associated therewith) or at least one of the one or more interfering streams (e.g., or one or more layers associated therewith).

In aspects, processing the signal comprises determining a channel matrix for the one or more serving streams and the one or more interfering streams. In aspects, processing the signal by performing joint demodulation using a MLM algorithm for at least one of the one or more serving streams or at least one of the one or more interfering streams comprises generating a joint transmitted data vector x by evaluating a limited number of all possible hypotheses for at least one of the one or more serving streams or the one or more interfering streams, wherein a component of the joint transmitted data vector x belongs to a discrete set of values corresponding to a modulation and coding scheme constellation. In aspects, evaluating a limited number of all possible hypotheses for at least one of the one or more serving streams or the one or more interfering streams comprises evaluating a most likely hypothesis corresponding to a largest exponential for at least one layer of the at least one of the one or more serving streams or the one or more interfering streams when calculating probabilities of bits for a hypothesis. In aspects, evaluating a limited number of all possible hypotheses for at least one of the one or more serving streams or the one or more interfering streams further comprises using only maximum values of remaining exponentials for layers of the streams when calculating probabilities of bits for a hypothesis. In aspects, evaluating a limited number of all possible hypotheses for at least one of the one or more serving streams or the one or more interfering streams further comprises using a sum of a subset of the remaining exponentials for layers of the streams when calculating probabilities of bits for a hypothesis. In aspects, evaluating a limited number of all possible hypotheses for at least one of the one or more serving streams or the one or more interfering streams further comprises adding linear numerical approximations of the remaining exponentials for layers of the streams when calculating probabilities of bits for a hypothesis. In aspects, processing the signal by performing joint demodulation using a max log map (MLM) algorithm for at least one of the one or more serving streams or at least one of the one or more interfering streams comprises calculating log likelihood ratios (LLRs) for one or more of the serving streams and not for the one or more interfering streams.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and BLU-RAY® media disc where disks usually reproduce data magnetically, while discs reproduce data optically with lasers. Combinations of the above should also be included within the scope of computer-readable media.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of wireless communication, comprising:
   receiving, by a wireless communications device, a signal comprising one or more serving streams and one or more interfering streams; and
   processing, by the wireless communications device, the signal by performing joint demodulation using a max log map (MLM) algorithm for at least one of the one or more serving streams or at least one of the one or more interfering streams, wherein processing the signal by performing joint demodulation using a MLM algorithm for at least one of the one or more serving streams and at least one of the one or more interfering streams comprises:
   generating, by the wireless communications device, a joint transmitted data vector x by evaluating a limited number of all possible hypotheses for at least one of the one or more serving streams or the one or more interfering streams, wherein a component of the joint transmitted data vector x belongs to a discrete set of values corresponding to a modulation and coding scheme constellation.

2. The method of claim 1, wherein processing the signal comprises determining a channel matrix for the one or more serving streams and the one or more interfering streams.

3. The method of claim 1, wherein evaluating a limited number of all possible hypotheses for at least one of the one or more serving streams or the one or more interfering streams comprises:
   evaluating a most likely hypothesis corresponding to a largest exponential for at least one layer of the at least one of the one or more serving streams or the one or more interfering streams when calculating probabilities of bits for a hypothesis.

4. The method of claim 3, wherein evaluating a limited number of all possible hypotheses for at least one of the one or more serving streams or the one or more interfering streams further comprises using only maximum values of remaining exponentials for layers of the streams when calculating probabilities of bits for a hypothesis.

5. The method of claim 3, wherein evaluating a limited number of all possible hypotheses for at least one of the one or more serving streams or the one or more interfering streams further comprises using a sum of a subset of the remaining exponentials for layers of the streams when calculating probabilities of bits for a hypothesis.

6. The method of claim 3, wherein evaluating a limited number of all possible hypotheses for at least one of the one or more serving streams or the one or more interfering streams further comprises adding linear numerical approximations of the remaining exponentials for layers of the streams when calculating probabilities of bits for a hypothesis.

7. The method of claim 1, wherein processing the signal by performing joint demodulation using a max log map (MLM) algorithm for at least one of the one or more serving streams or at least one of the one or more interfering streams comprises calculating log likelihood ratios (LLRs) for one or more of the serving streams and not for the one or more interfering streams.

8. An apparatus for wireless communication, comprising:
   means for receiving a signal comprising one or more serving streams and one or more interfering streams; and
   means for processing the signal by performing joint demodulation using a max log map (MLM) algorithm for at least one of the one or more serving streams and at least one of the one or more interfering streams, wherein the means for processing the signal by performing joint demodulation using a MLM algorithm for at least one of the one or more serving streams and at least one of the one or more interfering streams comprises:
   means for generating a joint transmitted data vector x by evaluating a limited number of all possible hypotheses for at least one of the one or more serving streams or the one or more interfering streams, wherein a component of the joint transmitted data vector x belongs to a discrete set of values corresponding to a modulation and coding scheme constellation.

9. The apparatus of claim 8, wherein the means for processing the signal comprises means for determining a channel matrix for the one or more serving streams and the one or more interfering streams.

10. The apparatus of claim 8, wherein the means for evaluating a limited number of all possible hypotheses for at least one of the one or more serving streams or the one or more interfering streams comprises:
means for evaluating a most likely hypothesis corresponding to a largest exponential for at least one layer of the at least one of the one or more serving streams or the one or more interfering streams when calculating probabilities of bits for a hypothesis.

11. The apparatus of claim 10, wherein the means for evaluating a limited number of all possible hypotheses for at least one of the one or more serving streams or the one or more interfering streams further comprises means for using only maximum values of remaining exponentials for layers of the streams when calculating probabilities of bits for a hypothesis.

12. The apparatus of claim 10, wherein the means for evaluating a limited number of all possible hypotheses for at least one of the one or more serving streams or the one or more interfering streams further comprises means for using a sum of a subset of the remaining exponentials for layers of the streams when calculating probabilities of bits for a hypothesis.

13. The apparatus of claim 10, wherein the means for evaluating a limited number of all possible hypotheses for at least one of the one or more serving streams or the one or more interfering streams further comprises means for adding linear numerical approximations of the remaining exponentials for layers of the streams when calculating probabilities of bits for a hypothesis.

14. The apparatus of claim 8, wherein the means for processing the signal by performing joint demodulation using a max log map (MLM) algorithm for at least one of the one or more serving streams or at least one of the one or more interfering streams further comprises means for calculating log likelihood ratios (LLRs) for one or more of the serving streams and not for the one or more interfering streams.

15. An apparatus of wireless communication, comprising:
a receiver configured to receive a signal comprising one or more serving streams and one or more interfering streams; and
at least one processor configured to process the signal by performing joint demodulation using a max log map (MLM) algorithm for at least one of the one or more serving streams and at least one of the one or more interfering streams, wherein the at least one processor is further configured to process the signal by performing joint demodulation using a MLM algorithm for at least one of the one or more serving streams and at least one of the one or more interfering streams by generating a joint transmitted data vector x by evaluating a limited number of all possible hypotheses for at least one of the one or more serving streams or the one or more interfering streams, wherein a component of the joint transmitted data vector x belongs to a discrete set of values corresponding to a modulation and coding scheme constellation.

16. The apparatus of claim 15, wherein the at least one processor is further configured to determine a channel matrix for the one or more serving streams and the one or more interfering streams.

17. The apparatus of claim 15, wherein the at least one processor is further configured to evaluate a limited number of all possible hypotheses for at least one of the one or more serving streams or the one or more interfering streams by evaluating a most likely hypothesis corresponding to a largest exponential for at least one layer of the at least one of the serving streams and at least one of the interfering streams.

18. The apparatus of claim 17, wherein the at least one processor is further configured to evaluate a limited number of all possible hypotheses for at least one of the one or more serving streams or the one or more interfering streams using only maximum values of remaining exponentials for layers of the streams when calculating probabilities of bits for a hypothesis.

19. The apparatus of claim 17, wherein the at least one processor is further configured to evaluate a limited number of all possible hypotheses for at least one of the one or more serving streams or the one or more interfering streams using a sum of a subset of the remaining exponentials for layers of the streams when calculating probabilities of bits for a hypothesis.

20. The apparatus of claim 17, wherein the at least one processor is further configured to evaluate a limited number of all possible hypotheses for at least one of the one or more serving streams or the one or more interfering streams by adding linear numerical approximations of the remaining exponentials for layers of the streams when calculating probabilities of bits for a hypothesis.

21. The apparatus of claim 15, the at least one processor is further configured to calculate log likelihood ratios (LLRs) for one or more of the serving streams and not for the one or more interfering streams.

22. A computer program product for wireless communication, comprising a non-transitory computer readable medium having one or more instructions stored thereon for causing a wireless communications device to:
receive a signal comprising one or more serving streams and one or more interfering streams; and
process the signal by performing joint demodulation using a max log map (MLM) algorithm for at least one of the one or more serving streams and at least one of the one or more interfering streams, wherein the instructions for causing the wireless communications device to process the signal comprise instructions for causing the wireless communications device to:
generate a joint transmitted data vector x by evaluating a limited number of all possible hypotheses for at least one of the one or more serving streams or the one or more interfering streams, wherein a component of the joint transmitted data vector x belongs to a discrete set of values corresponding to a modulation and coding scheme constellation.

23. The computer program product of claim 22, wherein the computer readable medium further includes one or more instructions stored thereon for:
evaluating a most likely hypothesis corresponding to a largest exponential for at least one layer of the at least one of the serving streams and at least one of the interfering streams.

24. The computer program product of claim 23, wherein the computer readable medium further includes one or more instructions stored thereon for:

using only maximum values of remaining exponentials when calculating probabilities of bits for a hypothesis.

25. The computer program product of claim 23, wherein the computer readable medium further includes one or more instructions stored thereon for:

adding linear numerical approximations of the remaining exponentials for layers of the streams when calculating probabilities of bits for a hypothesis.

26. The computer program product of claim 22, wherein the computer readable medium further comprises one or more instructions for calculating log likelihood ratios (LLRs) for one or more of the serving streams and not for the one or more interfering streams.

* * * * *